United States Patent [19]

Eberhart

[11] 3,951,175
[45] Apr. 20, 1976

[54] EXTERNAL INTERNAL CHANNELS IN GLASS TUBING

[76] Inventor: Wolfgang R. Eberhart, 1115 Jarvis St., Windsor, Ontario, Canada

[22] Filed: Apr. 5, 1974

[21] Appl. No.: 458,097

Related U.S. Application Data

[62] Division of Ser. No. 288,971, Sept. 14, 1972, Pat. No. 3,837,830.

[52] U.S. Cl. .............................. 138/178; 138/103; 138/111; 165/156; 202/185 D; 202/185 E
[51] Int. Cl.² .......................................... F16L 9/10
[58] Field of Search ................... 202/185 D, 185 E; 138/111, 114, 115, 116, 103, 178; 313/290; 29/473.9; 165/156, 160, 163

[56] References Cited
UNITED STATES PATENTS

| | | | |
|---|---|---|---|
| 1,881,718 | 10/1932 | Lawrie | 202/185 E X |
| 2,324,257 | 7/1943 | Ekert | 165/156 X |
| 2,425,669 | 8/1947 | Brock | 165/156 X |
| 3,296,817 | 1/1967 | Stoelting | 165/156 |
| 3,536,462 | 10/1970 | Eyster et al. | 65/32 |
| 3,696,003 | 10/1972 | Fitch et al. | 202/185 E X |

OTHER PUBLICATIONS

Corning Glass works, Corning N.Y., *Laboratory Glassware*, Lab-1, 1967–1968, Suppl. 5, pp. 0,2,255 and 266.
Corning Glass Works, *Custom Made Condensers*, Laboratory Glassware Sales Department, copyright 1960, pp. 189, 193 and 288.

*Primary Examiner*—Richard E. Aegerter
*Assistant Examiner*—James E. Bryant, III
*Attorney, Agent, or Firm*—Miller, Morriss, Pappas & McLeod

[57] ABSTRACT

A method for forming integral internal channels defined by a wall with an annular cross-section inside high softening temperature glass tubing is described. In particular, a reduced pressure is provided inside a rotating tube with heating outside which softens the glass for deformation by the reduced pressure while a smaller tube is maintained in position in contact with the inside walls of the larger tube. The pressure in the smaller tube is usually the same as that in the larger tube and is such that it can collapse at the point of contact to form at least one fusion band along the inside wall of the larger tube. The position of the smaller tube is maintained such that the larger tube has concave depressions between the fusion bands. Usually the heating is accomplished by a gas flame ring burner positioned under the larger tube and moved progressively along the larger tube until the desired fusion of the tubes is completed. The next step which is preferred is to provide a positive pressure in the larger tube with heating to soften the glass to move the concave depressions out and mold them against a platen provided in spaced relation to the depressions outside of the larger tube. This can also be progressively accomplished with the ring burner. While the glass tubes are being manipulated, the sections being fused and molded are maintained above the strain point temperature of the glass. The glass is then usually annealed and then it is cooled. The articles produced are strain free, compact, durable and particularly useful for heat transfer applications such as reflux, still-head and take-off condensers used in conducting chemical reactions and liquid distillation operations. Preferably the channels form a helical coil inside the tube. In addition an electrical resistance wire can be provided in the channels to produce reaction vessels suitable for heating liquids and for conducting chemical reactions.

8 Claims, 11 Drawing Figures

PROVIDING A SMALL DIAMETER TUBE INSIDE AND IN CONTACT WITH THE INNER WALLS OF A LARGER DIAMETER TUBE AND ANCHORING AND CLOSING ONE END OF SMALLER TUBE

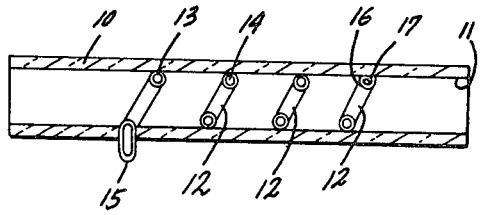

STEPS 1 AND 2

CLOSING ENDS OF LARGER TUBE SUCH THAT IT IS ROTATABLE AND SUCH THAT IT AND THE OPEN END OF THE SMALLER TUBE ARE CONNECTED TO PRESSURE VARYING MEANS

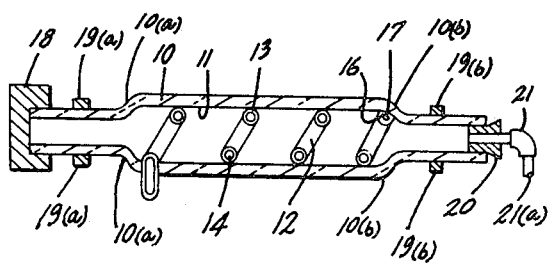

STEP 3

ROTATING AND HEATING THE LARGER TUBE WHILE APPLYING A REDUCED PRESSURE TO LARGER TUBE TO FORM FUSION BANDS

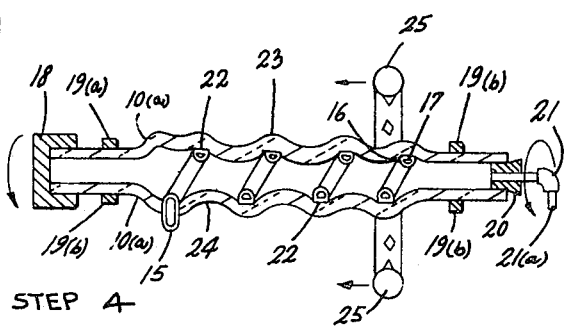

STEP 4

PREFERABLY PROVIDING AN ELEVATED PRESSURE IN LARGER TUBE WITH HEATING TO MOVE DEPRESSED SURFACES OUTWARD TO CONFORM TO PLATEN

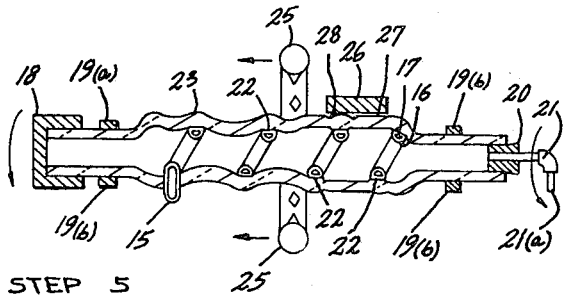

STEP 5

COOLING TO PREVENT CRACKING AND OPENING ANY GLASS SEALED ENDS OF AT LEAST THE LARGER TUBE

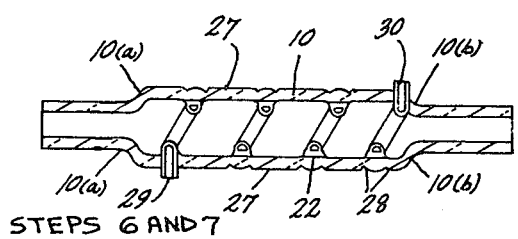

STEPS 6 AND 7

*FIG. 1*

EXTERNAL INTERNAL CHANNELS IN GLASS TUBING

CROSS REFERENCE TO RELATED APPLICATION

This application is a divisional of application Ser. No. 288,971, filed Sept. 14, 1972, now U.S. Pat. No. 3,837,830.

BACKGROUND OF THE INVENTION

The present invention relates to a method of forming integral internal channels in glass tubing and to the resulting articles of manufacture. More particularly the invention relates to a method for forming such channels wherein there is a continuous fusion band formed by fusing a smaller tube along the length of the inner walls of a larger tube.

The nature, composition and treatment of glass is described in Kirk-Othmer, Encyclopedia of Chemical Technology, Volume 10, pages 533 to 604 (1966, 2nd Edition). The silica (quartz) and borosilicate glasses discussed in this publication are of particular interest in relation to the present invention since they can be softened to make them plastic but not fluid and thus can be worked at elevated temperatures. The other conventional glasses have too low a fluid temperature and/or are otherwise unsuitable for the present invention. This kind of low softening temperature glass is shown in U.S. Pat. No. 3,679,385, for instance.

The strain point of glass is defined as that temperature at which the internal stresses in the glass are reduced in a matter of hours depending upon the mass of the glass article. The viscosity of the glass at the strain point is usually about $10^{14.5}$ poises. The annealing point of glass is defined as that temperature at which the internal stresses are reduced to acceptable limits for commercial use of the glass in a matter of minutes. The viscosity at the annealing point is about $10^{13}$ poises. The borosilicate glasses have a strain point temperature above about 400° C, an annealing temperature above about 500° C and a softening point slightly higher. Quartz has a strain point temperature above about 800°C, an annealing point above about 900° C and a softening point of about 1500° C. The lower strain point and higher annealing temperatures are a function of the composition of the glass. Such glasses are sold in clear form, but can be surface colored in ways well known to those skilled in the art.

The formation of glass to glass seals in high softening temperature silica and borosilicate glasses and heat treatment of glass tubes is well known and the prior art is illustrated in U.S. Pat. No.'s 3,320,352; 3,536,462 and 3,634,056. These patents disclose that ring seals can be formed by heating a small section of a larger diameter tubing in mating contact with the outside surface of a smaller diameter tubing while applying a reduced pressure inside the outer tube. In this manner the ring seal closes and bonds the ends of the tubes so joined. However, those skilled in the art have believed, when long spaced sections of glass are fused in this manner, that the internal strains resulting upon cooling of the glass would cause cracking and breakage even with annealing. Thus, glassware with integral internal channels for applications such as heat transfer have been unavailable as articles of commerce.

The prior art has produced tubular glass structures with internal glass channels along their length spaced away from the tube walls for heat transfer applications, particularly reflux and still-head condensers to be used for laboratory bench scale chemical reactions. Such condenser structures would be more useful if they could provide more efficient heat transfer and could be stronger. These novel structures would have a shorter length for equivalent heat transfer by comparison to prior art structures.

It is therefor an object of the present invention to provide a novel method whereby integral internal channels can be formed along substantial inside lengths of glass tubing without leaving strains in the glass which cause cracking and breakage upon cooling. It is further an object of the present invention to provide novel articles of manufacture comprising glass tubes with self-contained integral internal channels particularly useful for heat transfer applications by this method which are strong and provide relatively more efficient heat transfer in glass. Typical heat transfer applications include the condensation of vapor in liquid distillation condenser units, but the articles are also useful for the cooling or heating of liquid or gaseous streams as will be apparent to those skilled in the art. Further, coils of electrical resistance wire can be provided in the internal channels to provide heating surfaces in a cylindrical vessel for the heating of liquids. Vessels of such a unique design would have great utility for conducting chemical reactions and would be superior to oil baths and electric heating mantles now employed for this purpose in chemical laboratories and pilot plants.

IN THE DRAWINGS

FIG. 1 is a plan view and schematic flow diagram illustrating the steps in the preferred method of the present invention with particular reference to a longitudinal section view of the preparation of a cylindrical glass article with integral internal channels in the preferred form of a helical coil useful for heat transfer applications.

FIG. 2 schematically illustrates one additional step in the method of the present invention of an article shown in longitudinal section view, wherein a graphite rod or other heat transfer rod is provided positioned along the longitudinal axis of a larger cylindrical tube with a helical coil of glass tubing wound upon the rod which is inside and continuously connected to the preferred larger helical coil channels.

DESCRIPTION OF THE INVENTION

Figure 2:
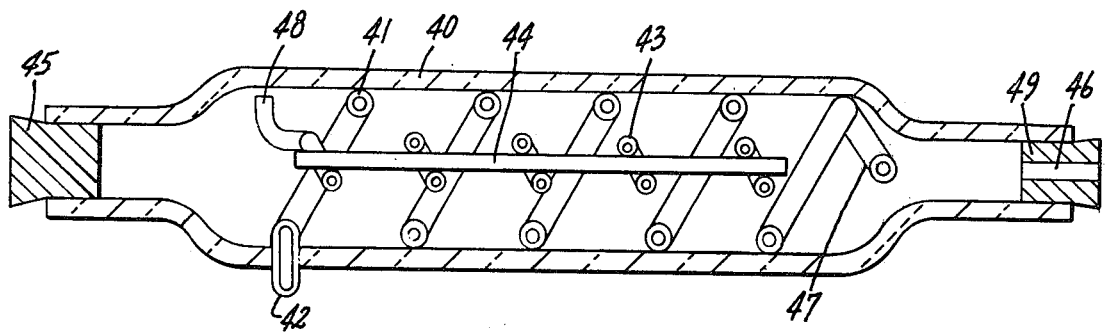

The present invention relates to the method of forming integral internal channels in glass tubing which comprises providing at least one first small tube with a closed end and an opening the outer wall of which is anchored to the inner wall of a larger open ended second tube in a line of glass to glass contact; closing the ends of the larger tube such that the larger tube with the anchored smaller tube inside is rotatable along its length and such that the smaller tube and the larger tube are connected at the other end to means for varying the pressure inside the tubes; rotating the larger tube with heating of the outside wall of the larger tube so that the points of contact of the smaller and larger tube walls are softened and while providing a reduced pressure in the larger tube and a pressure in the smaller tube permitting it to deform by partial collapse at the point of contact to form integral fusion bands along the inner walls of the larger tube with concave depressions between the fusion bands, preferably providing an elevated pressure within and rotating the larger tube while heating the outside wall of the larger tube to soften the glass and while contacting the softened glass with a platen for molding the walls between the fusion bands so that the elevated pressure acts to move the depressed surfaces outward to conform to the platen; cooling the tubes with the fused bands so as to prevent cracking; and opening any glass sealed ends of at least the larger tube. The closed end of the smaller tube is opened for condensers and the like but can remain closed such as when heating wire is implanted through the closed end.

The present invention also relates to the article of manufacture which comprises a first rounded wall tube, preferrably cylindrical, of glass open at both ends; and at least one second rounded wall tube of glass having an internal channel and which is integrally fused as a band along the inside length of the first tube, such that the thickness of the fusion bands is the sum of the thicknesses of the walls of the tubes and the first wall is at least about 1.5 mm. thick and the band width is defined by an arcuate portion of the inner wall of the first tube, the glass having a softening temperature above 500° C and being plastic for working without being fluid. The preferred articles have the channels in the form of a helical coil fused to the inner wall of the larger first tube. The larger tube is materially strengthened by the fusion band provided by the helical coil.

Tubular glass structures with integral internal glass channels along their length are of interest for heat transfer applications, particularly the laboratory reflux and still-head condensers. Condensers constructed in this manner provide a marked increase in the heat transfer surface area relative to the volume of the condenser because of the cooling of the outer tube walls by the channel walls, resulting in more efficient, more compact units. Further, because the channels are integral within the outer wall of the tubular structure, there is a reinforcing action, leading to a stronger, more rugged unit, particularly conventional reflux condensers and still-head condensers with separated internal tubes as are now used in chemical laboratories, pilot plants and full scale manufacturing plants.

Referring to FIG. 1, in Steps 1 and 2, a tube 10 with an inner wall 11 is provided around a smaller tube 12 in the form of the preferred helical coil, the outer wall 13 of which is in contact with the inner wall 11 of the larger tube 10. The helical coil is formed by winding softened tubing on a mandril or hollow tube (not shown) of copper, glass or graphite. The tube 12 has a central hole or channel 14. As illustrated the tubes 10 and 12 are shown in cross-section along the central longitudinal axis of the larger tube 10 and the smaller tube 12 is shown as the cross-section of the helical coil, the outer wall 13 of which is in continuous line contact with the inner wall 11 of the larger tube 10. This can be accomplished by precision fitting or preferrably by softening the tube 10 and using a graphite platen to bring the tubes 10 and 12 into press fit, which also anchors them together. The line of contact 13 of the tubes 10 and 12 is cleaned of foreign matter. At one end, the helical coil is preferrably anchored to or through the wall 11 of the larger tube 10 and has a glass or other sealing closure 15. Alternatively, the smaller tube 12 can have its closed end inside the tube 10. The anchoring can be by mechanical means such as graphite plugs holding the tubes 12 in place (not shown). At the other end 16 of the tube 12 an opening 17 to the inside of the tube 10 is provided. Preferably a small space (about 1 mm. to 2 mm.) is provided between the inner wall of the tube 10 and the beginning of the opening 17.

In Step 3, the ends of the tube 10 are rotationally mounted in the chucks 19a and 19b of a conventional glass working lathe (not shown). Closures 18 and 20 are provided at the open ends of necked down portions 10a and 10b of the larger tube 10 with a rotatable tube connector means 21 and conventional mouth tube 21a through one closure 20. The necked down portions 10a and 10b are produced in a conventional manner by heating and shaping with rotation or by fusing ends to the tube 10. One end of the tube 10 can be closed by a glass seal (not shown) rather than by the closure 18. The tube 21a is rotatably connected to a means for reducing the pressure (not shown) in the tube 10 such as the mouth. The opening 17 in tube 12 can be separately connected to a second means (not shown) for varying the pressure, above or below atmospheric pressure, but this is not preferred. The chucks 19a and 19b are in the horizontal glass working lathe and the means 21 for rotatably connecting the tubes 10 and 12 to the pressure means by metal ball or straight glass ball joint connection is well known to those skilled in the high temperature glass forming art.

In Step 4, the tube 10 is rotated on its longitudinal axis. The rate of rotation is such that it prevents sagging between the chucks 19a and 19b due to the centrifugal force imparted to the tube 10 and is preferably at a rate of between about 40 and 50 revolutions per minute which is slow enough to allow fusion of the tubes 10 and 12. Higher rates of rotation can be used providing the fusion operation can be performed. Heating means 25, conventionally in the form of oxygen and natural gas flame from a ring of bench multi-jet burner, are provided to heat the outside circumference of the tube 10 at one end progressively to the other end. Other well known oxidizable gases, such as hydrogen, could be used in place of natural gas. A reduced pressure is applied in the tube 10 through the tube 21a. Preferrably the reduced pressure in the tubes 10 and 12 is just below atmospheric (about 5 to 10 torr less than atmospheric) and can be obtained mechanically or by withdrawing air by mouth. Usually the pressure inside the tube 12 is the same as that in the tube 10 because the tube 12 is open to the inside of tube 10. As heat is applied to the outside of the tube 10 while the pressure is reduced inside of tubes 10 and 12, the tubes 10 and 12 soften and fuse together at the point of contact 13 to form an integral fusion band 22 with a ridge 23 along the fusion bands 22 and depressions 24 between the fusion bands 22. At this point, the softened tube 10 diameter can be varied using conventional shaping with a rod or platen (not shown) or by using elevated or reduced pressures in the tube 10 (see FIG. 6).

In Step 5, preferably, a positive pressure is applied in the tube 10 so that the depressions 24 are moved outward against the surface of a platen 26 which is usually composed of graphite or carbon graphite because of its heat transfer properties. Rotation can provide centrifugal force which aids in moving the softened glass outward and makes shaping easier. The sections 27 between the ridges 23 are straightened in this manner, and can result in shallow grooves 28 on either side of the ridges 23 along the fusion band 22. These ridges 23 can be readily removed with careful molding of the softened glass.

Moderate heating with a wide yellow flame is used when the glass is at room temperature going up to 200° C to 300° C to prevent cracking during preheat stages. The ring burner 25 is satisfactory for this moderate heating and the heat to the glass can be regulated by adjustment of the burning gas pressure and/or the amount of oxygen. Steps 4 and 5 are performed while maintaining the glass above the strain point temperature during manipulation, to also prevent cracking. There can be cooling and reheating between the fusion and molding steps, but before any manipulation of the glass tubes the temperature must exceed the strain point temperature. Preferably the softening temperature is between about 1245° C to 1260° C for borosilicate glass and 2500° C to 2700° C for silica glass.

In Step 6, the glass is preferably annealed with conventional heating means (not shown) at a temperature sufficient for annealing which is also above the strain point temperature for a period of time, usually at 565° C for 7740 borosilicate glass ($Pyrex_{T.M.}$) or 910° C for silica glass and then slowly cooled, preferably at a rate between 2° to 5° C per minute in an annealing oven, as is well known to those skilled in the art.

In Step 7, the glass seal 15 at the closed end of the tube 12 is usually removed to provide an opening 29. Localized point heating is provided at opening 17 to fuse it to the inside wall 11 of the tube 10 and then a positive pressure is provided at opening 29 (such as with a flexible tube from the mouth) which blows out opening 30 so that there is a continuous channel between the openings 29 and 30. In any event, the tube 10 is open at both ends. The glass seal 15 at the end of tube 10 can be opened with cutting means or localized point heating.

Referring to FIG. 2, a variation in Step 3 of the method is illustrated. In particular, a larger tube 40 is shown in longitudinal cross-section is provided surrounding a helical coil 41 which is anchored at closed end 42 to the tube 40 as in FIG. 1. In addition, the tube 41 is provided with a smaller central helical coil 43 wound on a rod and is a continuous extension 47 of the larger helical coil 41. The rod 44 is usually made of graphite or other materials which prevent deformation by rapidly transferring heat away from the smaller coil 43. However, another glass tube or rod could be used instead with a parting agent. The tube 40 is provided with a closure 45. The other end of the tube 40 is provided with a closure 49 with an opening 46 for the vacuum means. The open end 48 of the coil 43 is preferably spaced about 1 mm. from the inside wall of the tube 40. The combination was then treated by the steps of the method illustrated in FIG. 1 and discussed above.

Figure 3A:
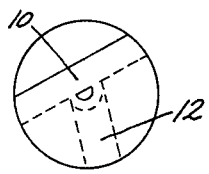
FIGS. 3 and 3a are front and detail views respectively of an article useful as a condenser illustrating an internal integral channel in the form of a helical coil fused to the inside of a larger tubular section prepared by the method shown in FIG. 1.
Figure 3:
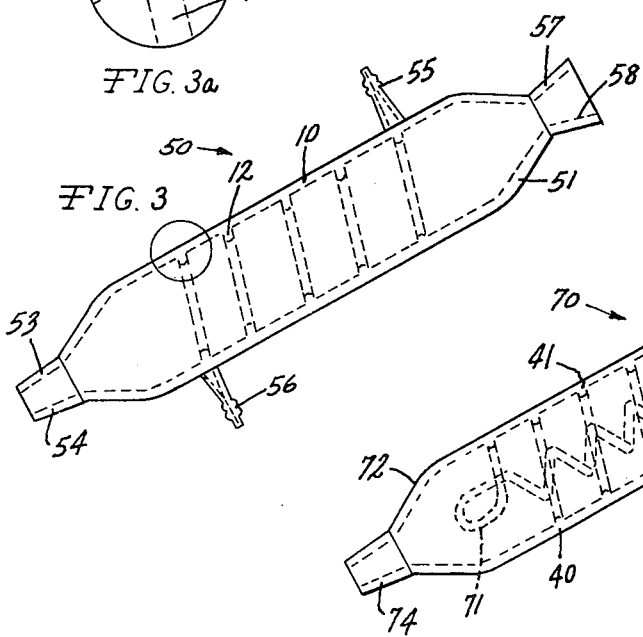

FIGS. 3 and 3a illustrate the product of FIG. 1 which has been modified into a condenser 50. In particular, the tube 10 is provided with conventional glass end closures 51 and 52 such as by heat fusing them to the tubing 10. The closure 52 is provided with an outside ground surface 53 adjacent opening 54. The other closure 51 is provided with an inside ground surface 58 in opening 57. The extension 16 of the coil 12 is bent and anchored through the wall of the tube 10 by heating and conventional flexible tubing type glass connectors 55 and 56 are provided by heat fusing them to the open ends 17 and 29 of the coil 12 provided through the wall 11 of the tube 10.

Figure 4A:
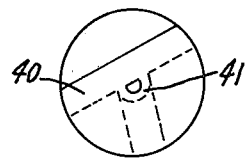
FIGS. 4 and 4a are front and detail views respectively of an article also useful as a condenser illustrating a central helical coil continuously connected to internal integral helical channels produced by a variation of the method of the present invention shown in FIG. 2.
Figure 4:
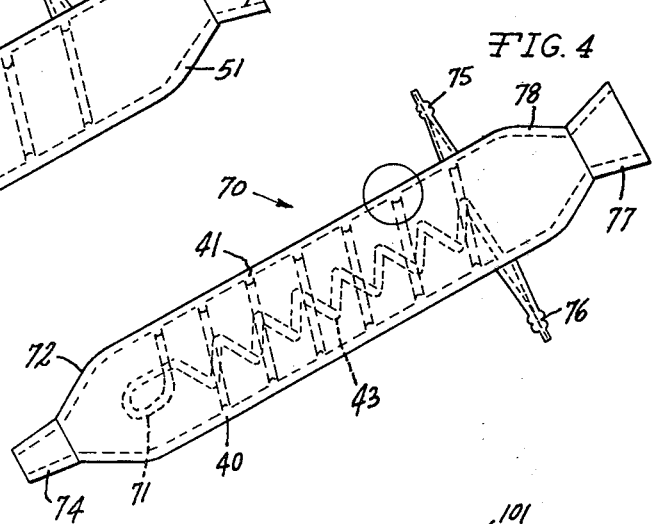

Referring to FIGS. 4 and 4a, a modified product produced by the use of the method step shown in FIG. 2 is illustrated in the form of a different condenser 70. Glass closures 72 and 78 are provided with ground ends 74 and 77. Glass flexible tubing connectors 75 and 76 are provided. In this case, the extension 48 has a heat formed curvature 73 and is fused through the wall of the tube 40. The fused section of the coil 41 is integrally and continuously joined with the tube 43 by curved section 71.

Figure 5:
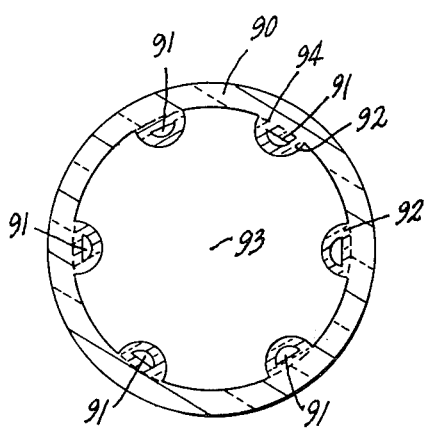
FIG. 5 is the cross-section view of an article illustrating multiple channels which are provided along the length of a cylindrical tube.

FIG. 5 illustrates the cross-section of a tube 90 wherein multiple internal channels 91 are formed by the walls 92 concentric with the longitudinal axis 93 of the tube 90. The broken lines 94 show the fusion band, the thickness of which is equal to the thicknesses of the walls of the tubes 90 and 92. The fusion band 94 width is shown in detail as being defined by an arcuate portion of the inner wall of the tube 90 in FIG. 5. A glass carbon or graphite plug (not shown) can be used to support the smaller tubes in position against the larger tube prior to fusion to the larger tube for anchoring and also can be maintained in position during fusion.

Figure 6:
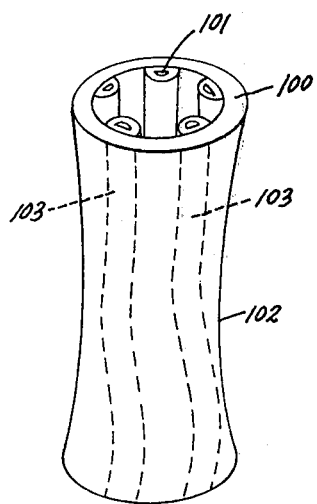
FIG. 6 is a front view of an article illustrating multiple channels where the bands are irregularly fused to the inside walls of a larger tube of varying cross-sectional area along its length.

FIG. 6 illustrates a tube 100 with multiple fused internal channels 101 wherein the tube 100 has a concave section 102 and wherein the channels 101 and fusion bands 103 have an irregular path along the length of the tube 100. This irregular path can be achieved by twisting the softened tube 100. Molding changes the diameter of the softened tube 100 as previously discussed.

As will be appreciated, tubes of any shape and number can be used in the method of the present invention, including completely filling the inside of the outer tube with tubes. The channels can be formed over any part of the inner surface of the outer glass tubing. The outer tube wall thickness is preferably at least about 1.5 mm. up to about 3.5 mm.; however, larger thicknesses can be used to permit working with rotation. The inner tubes can have relatively very thin or thick walls by comparison to the outer wall; however, usually they are less than about 3.5 mm. thick.

Figure 7:
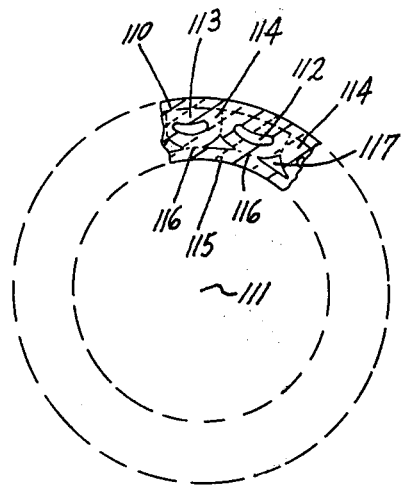
FIG. 7 is a partial cross-section view of still another article illustrating multiple channels which are provided along the inside length of an outer tube which with an inner tube sandwiches the channels.

FIG. 7 illustrates a section of the cross-section of a larger tube 110 across the axis 111. Channels 112 are provided in smaller tubes 113 fused at bands 114 (broken lines). A second tube 115 is also provided with fusion bands 116 on the other side of the smaller tubes 113, which is fused after formation of the channels 112 by repeating the method of the present invention with the reduced pressure provided in the space 117 between the tubes 110 and 115. Both tubes 110 and 115 could be fused simultaneously. This leaves a second series of channels 117.

Figure 8:
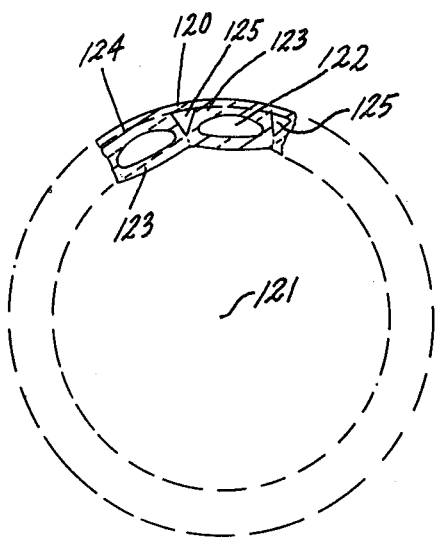
FIG. 8 is a partial cross-section view of an article illustrating multiple channels which are fused to each other and to the inside walls of a larger tube.

FIG. 8 illustrates a section of the cross-section of another tube 120 across the axis 121. Channels 122 are provided in tubes 123. Fusion bands 124 (broken lines) show where the tubes 120 and 123 are joined together leaving a second series of channels 125.

For the channeled articles shown in FIGS. 5 to 8, appropriate manifolds (not shown) of glass or other materials can be provided at the ends of the large and small tubes for isolating them from each other. Such variations will be obvious to those skilled in the art.

Figure 9:
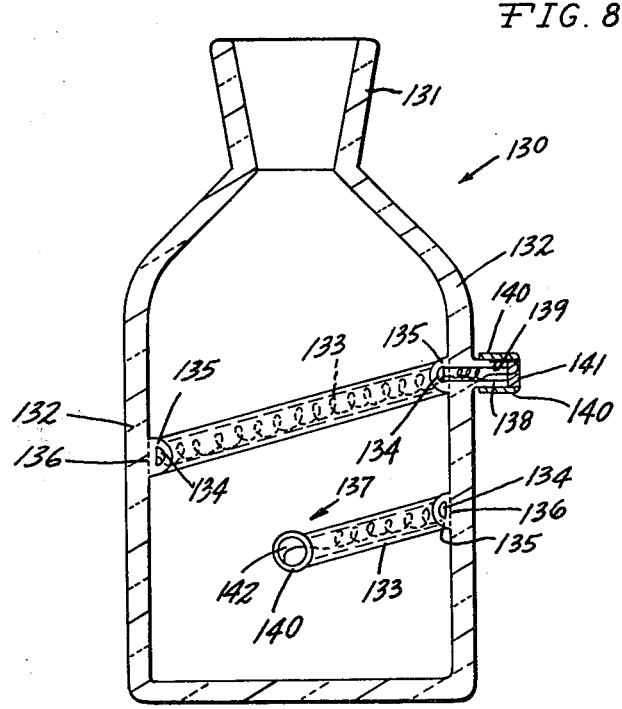
FIG. 9 is a cross-sectional view of a bottle illustrating a heating wire provided inside a preferred helical channel which is fused to the inner walls of the bottle.

FIG. 9 shows a heating bottle 130 with a 2.5 mm. wall thickness with an opening 131 and body 132. A coiled nichrome heating wire 133 is provided in the channel 134 of a helical smaller diameter tube 135 with a wall thickness of 1.5 mm., but otherwise the bottle is produced by the method of FIG. 1 including the preferred step. The wire 133 is preferrably provided in the tube 135 before fusion and becomes imbedded in the inner wall of the tube 135 after fusion because of collapse of the walls of the tube 135 during fusion. The fusion bands 136 are shown in broken lines. The ends 137 and 138 of the tube 134 are sealed through the side body walls 132 of the bottle 130. The ends of the wires 133 are bent over the ends of the tube 134 and are covered over with conductive rings 139 and 140 in press fit. The ring 139 and 140 ends and wire 133 ends can then be conductively fixed in position as with solder 141 and 142. It is preferred to provide the wire in the bottle during the formation of the fusion band 136 since the wire 133 will then be embedded in position and in contact with the glass of the tubing 134. Because of the thickness of the wall 132, there may be a slight ripple (not shown) upon removing the concave depressions and this can easily be removed with careful molding.

Vessels such as that shown in FIG. 9 are suitable for the heating of liquids, including distillation and for heating chemicals for reaction. Separate parallel channels such as dual helical coils can be provided such that one is for heating with an imbedded wire and the other is for cooling with a cooling agent. Such a vessel could be used to provide rapid cooling in the event that an exothermic chemical reaction became too energetic. These and other construction variations will be obvious to those skilled in the art from the present disclosure.

Comparative testing was done with prior art condensers. A 2-liter, 3-neck flask equipped with No. 29/42 inner/outer joints was used. All condensers tested were equipped with the same size inner joint. About one liter of acetone was placed in the flask and heated on a steam bath to produce an extremely vigorous boilup.

The condenser of the present invention as shown in FIG. 4 was able to condense the vapors readily and there was no flooding. The height of the cooling coil in the condenser was about 25 cm. and condensation occurred no higher than about 15 cm. (maximum height). The external diameter of the condenser was 7.5 cm. The wall thickness of the inner tube was about 1.5 mm. and the outer tube about 2 mm.

A standard 6-internal bulb condenser having an external annular cooling jacket flooded badly and could not contain the hot liquid-vapor mix and liquid exited at the top. The condenser height (cooling surface) was about 30 cm. The external diameter of the condenser was 3.6 cm. The inner and outer wall thicknesses were the same as those of the present invention.

A standard glass coil condenser (Scientific Glass Apparatus), having in addition to a full length annular jacket for cooling with a fairly tightly wound helical coil in the center spaced apart from the outer tube, was tested next. The cooling height was about 55 cm. and the external diameter was 4.6 cm. The inner and outer wall thicknesses were the same as those of the present invention. This condenser was able to handle the reflux with some flooding. The height at which the liquid condensed was about 24 cm. or about 50 percent above that of the condenser of the present invention. That is, the condenser of the present invention required about one-third (30–35 percent) less height to condense the acetone vapors. While the external diameter of the condenser of the present invention is 1.63 times that of the standard glass coil condenser, the most important space dimension is the height or length of the condenser required. It can thus be seen that the articles of the present invention are more efficient in heat transfer. It has also been found that they are much less prone to breakage than standard condensers because of the reinforcement of the outer tube by the channels.

I claim:
1. The article of manufacture which comprises:
   a. a first larger rounded wall tube of glass open at both ends; and
   b. at least one second rounded wall smaller tube of glass having an internal channel and wherein an outside length of the wall of the second smaller tube is integrally fused as a fusion band along an inside length of the wall of the first larger tube, such that the fusion band has a thickness which is the sum of a cross-sectional thickness of the walls of the tubes and the first larger tube wall is at least about 1.5 mm. thick and the fusion band width is defined by an arcuate portion of the inside wall of the first larger tube without going around the circumference of the larger tube so as to form a ring seal between the tubes, the glass having a high softening temperature above about 500° C and being plastic for working without being fluid, and wherein the fusion band between the inside length of the first larger tube and the outside length of the second smaller tube is produced while heating the outside of the first larger tube to soften the tubes and while applying a reduced pressure inside the first larger tube.

2. The article of claim 1 wherein the second tube is fused at regular intervals along the length of the first tube.

3. The article of claim 2 wherein the second tube is in the form of a helical coil, the outside walls of which are fused along the length of the inner walls of the first tube at regular intervals.

4. The article of claim 2 wherein the ends of the first tube are provided with tapered ground end joints.

5. The article of claim 2 wherein the ends of the first tube are provided with tapered ground end joints and wherein the ends of the second tube extend through the walls of the larger tube and are terminated with glass flexible tube connectors.

6. The article of claim 5 wherein the second tube extends at one end back through the first tube and through the side wall of the first tube to a glass flexible tube connector.

7. The article of claim 2 wherein the second tube is in the form of a helical coil, the outside walls of which are fused to the inner walls of the first tube along the length at regular intervals and at one end extends back along the length of the first tube inside the fused helical coil.

8. The article of claim 7 wherein the extension back of the second tube is also in the form of a helical coil, a coil longitudinal axis which is the same as a central longitudinal axis of the first tube and the larger fused helical coil.

* * * * *